W. McLEAN.
METHOD OF AND MEANS FOR MEASURING THE HARDNESS OR SOFTNESS OF EYES.
APPLICATION FILED DEC. 3, 1914.
1,291,050.
Patented Jan. 14, 1919.
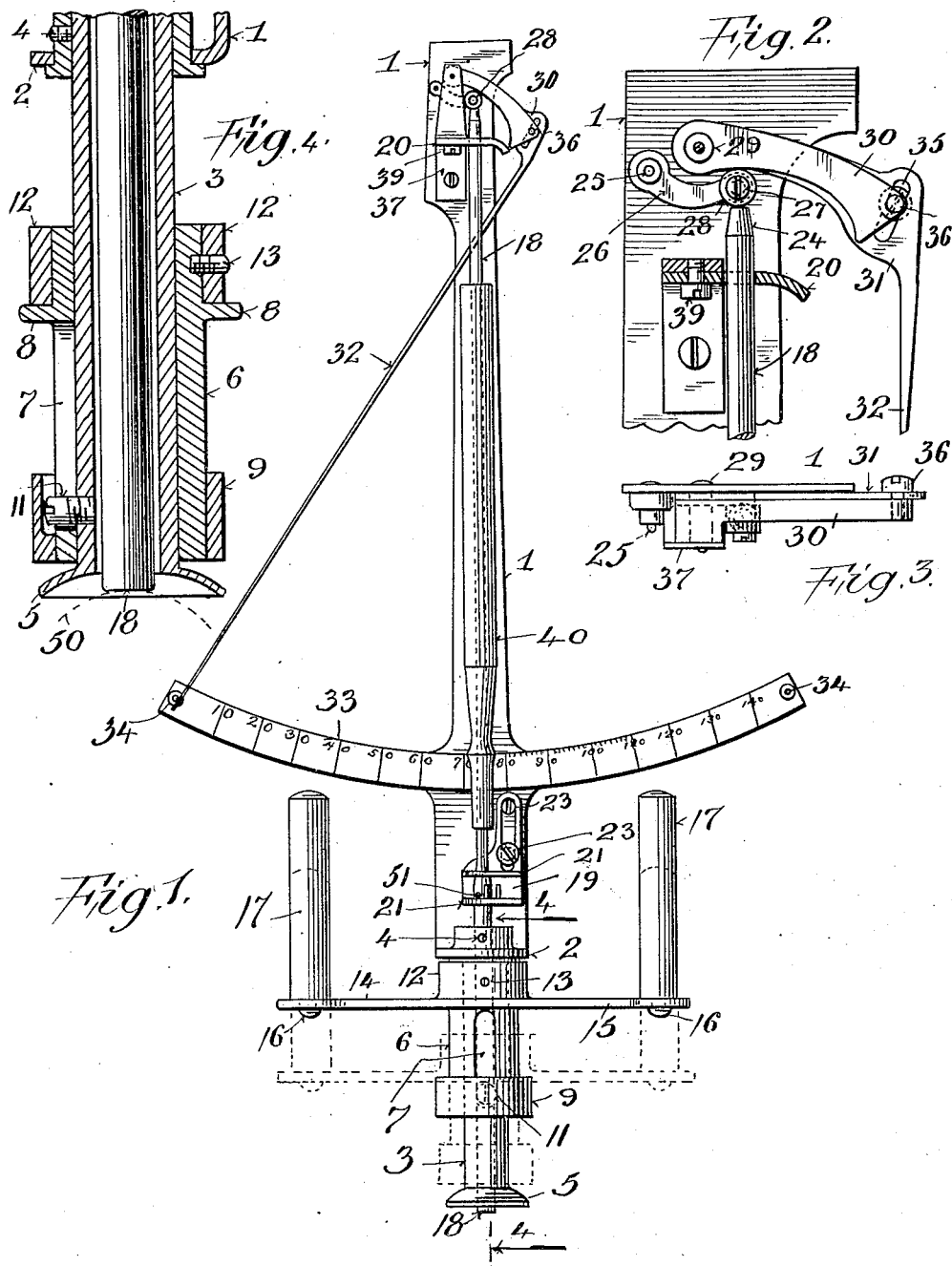

UNITED STATES PATENT OFFICE.

WILLIAM McLEAN, OF NEW YORK, N. Y.

METHOD OF AND MEANS FOR MEASURING THE HARDNESS OR SOFTNESS OF EYES.

1,291,050.  Specification of Letters Patent.  Patented Jan. 14, 1919.

Application filed December 3, 1914. Serial No. 875,286.

*To all whom it may concern:*

Be it known that I, WILLIAM MCLEAN, a citizen of the United States, residing at New York, in the county and State of New York, have made a certain new and useful Invention in Methods of and Means for Measuring the Hardness or Softness of Eyes, of which the following is a specification.

This invention relates to a method of and means for measuring the hardness or softness of eyes of human beings and animals.

The broad object of the invention is to provide a method of and apparatus for ascertaining the degree of hardness or softness of the eyeball, which is simple and efficient and wherein the readings obtained are direct.

A further object of the invention is to provide an instrument of the character referred to to be applied to the eye, such as the human eye, for accurately determining the degree of hardness or softness of the eye in readings compared to pressure readings in millimeters of mercury.

A further object of the invention is to provide an instrument of the character and for the purpose set forth, whereby the degree of hardness or softness of the eye ascertained in pressure of millimeters of mercury may be read directly upon the instrument without referring to coördinate charts or the like.

Further objects of the invention will appear more fully hereinafter.

The invention consists in a method and an apparatus to be employed therewith substantially in the construction, combination, location and relative arrangement of parts, all as will be more fully hereinfter set forth, as shown on the accompanying drawing and finally pointed out in the appended claims.

Referring to the drawing:—

Figure 1 is a view in front elevation showing an instrument embodying my invention.

Fig. 2 is an enlarged view in elevation showing the upper portion of the instrument, parts broken off and parts in section.

Fig. 3 is a top plan view of the construction shown in Fig. 2.

Fig. 4 is an enlarged broken view in section taken on the line 4—4, Fig. 1, and looking in the direction of the arrows.

The same reference numeral designates the same part wherever it occurs throughout the several views.

Eminent oculists have described the optic or eye as being a bag capable of holding water, and into and out of which a fluid is continually passing. If at any time the inlet flow does not equal the outlet flow an unequal pressure occurs, whereby the eye hardens or softens, and the invariable result is that the eye so afflicted loses its power of sight, or, in other words, becomes blind unless the pressure is again equalized. Like many other afflictions of this nature to this or other organs of the human body, if indications of the affliction can be ascertained, the disastrous results that heretofore have been inevitable may be forestalled. For this reason oculists have been in the practice of applying a finger tip to the eyeball of the patient and gently pressing the same to determine whether or not the eye was normal or either abnormally hard or soft. Heretofore this method was universally used, but the defects and inefficiency of the same are apparent. In the first place, each individual oculist would depend entirely upon his personal sense of touch. While there were many other defects in this method, the one above named was sufficient from a scientific view-point to make a more efficient method desirable.

In my invention in its broadest scope I provide a method, and in connection therewith an instrument which may be applied directly to the eye under observation, and which will indicate directly and accurately the hardness or softness of the eye in direct readings of pressure in millimeters of mercury.

In one form of my invention, as disclosed in the drawing, I provide a frame 1 of suitable rigidity. I prefer to make this frame of metal, but it is obvious that any other suitable material may be employed. The bottom or lower end of the frame is provided with a lug or projection 2 which extends at approximately a right angle from the frame and is provided with an orifice through which extends a hollow tube or pipe 3 which in turn is rigidly secured to the frame 1 by means of a screw or other suitable means 4. The lower end of the tube or pipe 3 is formed with a concave flared base as shown at 5, Figs. 1 and 4, of approximately the contour of the eyeball as indicated at 50 in dotted lines, Fig. 4. Mounted upon the tube 3 to move freely and vertically thereover is a larger hollow tube 6 which is provided with a circumferential lug or projection 8. If desired, and as shown, the tube 6 may have secured to it at its lower end a covering 9 to serve as a base to seat against the flared base 5 of the tube 3. From the foregoing it is evident that the tube 6 may move longitudinally over the tube 3 within the limits of the lug 2 and the base 5.

Seated upon the lug 8, and mounted over the upper end of the tube 6 and rigidly secured thereto by means of a screw or other suitable means 13, is a collar 12. This collar is provided with two extending legs 14, 15, which extend in opposite directions from each other. Suitably secured to the ends of these respective legs, by means of screws or other suitable means 16, are two vertical handles 17. By means of these handles the instrument is held and applied to the eye to be tested.

A plunger 18 runs throughout the vertical length of the instrument passing through the hollow tube 3 and through a suitable adjustable guide 20, which will be more fully hereinafter described. Any suitable means may be employed to limit the vertical movement of the plunger. I find it sufficient to attach to the frame 1 by screws or other suitable means 23, a strip 19 provided with flanges 21 through which the plunger runs. A pin 51, which is attached to the plunger is positioned between the flanges 21 to be limited thereby in its and the plunger's vertical movement.

The plunger 18 may be of any suitable material or construction, but I find it preferable to employ a plunger of highly polished steel or other material, having its upper end slightly tapered, and terminating in a flat smooth surface, as shown at 24, Fig. 2. A pin 25 suitably attached to the frame 1 forms a shaft on which is mounted to rock thereon an arm 26. A screw or other suitable shaft 27 is fixed to the end of the arm 26, on which is mounted, to rotate thereabout, a roller 28. The pin 25 is so positioned on the frame 1 with respect to the position of the plunger that for the limited vertical movement of the plunger, the end of the plunger will at all times be in contact with the roller 28, so that if the plunger is raised, the roller will be moved thereby in an arc about the pin 25 as a center. At normal initial position, that is when the plunger is at its lowest position with pin 51 resting on lower flange 21, the roller rests on the end of the plunger by gravity. The frame 1 serves as one bearing for a shaft or pin 29 which is positioned slightly above and between the pin 25 and the end of the plunger 24. Mounted upon this shaft or pin to freely rock thereon, is an arm 30. Also mounted on the shaft or pin 29 to rock thereon is an angle arm 31 which terminates in a tapered pointer 32 which points to or terminates opposite a scale member 33, its extreme movements being limited in both directions by pins 34 suitably mounted at the ends of said scale member. The angle portion of the pointer arm, 31, is enlarged to allow for a slot or opening therein, as shown at 35. An opening or hole at the end of the arm 30 allows a set screw or other suitable adjustable fastener 36 to pass therethrough and through the slot 35 to adjustably secure the pointer arm 31 to the arm 30. An angle piece 37, is screwed or otherwise attached to the frame 1, the upper leg of the angle piece serving as the outer bearing of the shaft or pin 29.

The guide 20, above referred to, is attached to the under surface of the angle piece 37, by any suitable means such as a screw 39, and is provided with an extending arm which is curved, if desired, to form a stop or rest for the arm 30 to which is attached the pointer 31, 32, said arm 30 resting on the stop when the pointer 32 is in its initial position at zero reading on the scale member 33.

From the foregoing it will be seen that the instrument is applied to the eyeball by being held vertically with relation thereto by means of the handles 17 and with the lower end of the plunger 18 in direct contact against the eyeball, as indicated in Fig. 4. In this relation the weight of the plunger acts in opposition to the degree of hardness of the eye which causes the plunger 18 to move vertically in its guide 20 thereby forcing the roller 28 upward, the roller in turn forcing the arms 30 and 31 upward and causing the pointer 32 to move over a space of the scale 33 in a definite proportion to the distance through which the plunger 18 rises.

It will be observed that by the arrangement of the plunger end and the arms 26, 30 and 31 described, and shown in detail in Fig. 2, I secure a large degree of displacement of the pointer 32 in proportion to the distance of upward movement of the pointer, thereby enabling me to employ a minutely graduated scale and to secure highly accurate results.

I find it advisable to support the lower portion of the plunger 18 in such a manner that the friction between the plunger and the interior wall of the hollow tube 3 will be reduced to a minimum. For this purpose I employ one or more pins or projections extending through the tube 3. In Fig. 4, I show one of these projections, 11, which may be in the form of a screw to allow the adjustment thereof. It is obvious that when more than one of these projections are employed, it is preferable to position them equidistant from each other on the periphery of the tube 3. If desired, and as shown, a slot 7 may be cut in the tube 6 to facilitate the adjustment of the projection 11. It is evident, however, that these parts are mere details, and that my invention, in its broadest scope, as defined in the claims, is not to be limited thereto.

In instruments of the class described, where an accurate result is absolutely necessary, or rather, where an inaccurate result, however small, may be of inestimable injury to the eye being tested, it is essential to reduce the friction of the moving parts to a minimum. I have described how friction between the plunger and the tube 3 is minimized. It will be noted that by employing the roller 28 which comes in contact with the plunger end 24, the arm 30 is raised by the rolling action of the roller 28, thereby eliminating friction between the roller and the arm 30. The only friction that is present is the friction of the roller 28 on its axle 27.

It is evident that a highly accurate instrument of the class and for the purposes described must be of fine material and of skilled workmanship, and in consequence, the various parts will be comparatively light. Inasmuch as the graduation of the scale has been determined by an average taken on actual tests carried on for a period of several years upon hundreds of eyes, and as a plunger of a definite predetermined weight was employed, the hardness or pressure of the eye acting in opposition or resistance to the actual total weight of the plunger, it might be necessary to employ an added weight to give the plunger its necessary total amount. I have therefore shown a weight 40 suitably attached to the plunger 18 by means of a screw or other suitable means, not shown. As this weight may be of any desired construction or material it is not deemed necessary to describe it further except to state that, as shown, it is permanently fixed upon the plunger between the guides 19 and 20 so that it does not rub against or come in contact with the frame 1 on the upward or downward movement of the plunger.

In view of the fact that the eye is a very sensitive organ, it is usually necessary to treat the eye with some anesthetizing agent to deaden the sensitiveness of the eye so that the instrument may be applied to it. In the use of the instrument, the supporting framework is caused to rest over and upon the eye of the patient with the plunger 18 resting vertically upon the eyeball. By reason of the fact that the plunger 18 is gravity actuated, the resistance pressure exerted by the eyeball upon the plunger 18 will cause said plunger to be longitudinally displaced relative to the framework which supports it. The displaceable arrangement of the carrier sleeve 6 enables the operator to determine when the instrument is properly applied and the resistance pressure of the eyeball is properly exerted upon the plunger in opposition to the weight thereof.

While I have described in detail and shown one form of construction embodying the principles of my invention, it will be understood that many detail changes may be made by those skilled in the art without departing from the broad scope of my invention as defined in the claims.

Having now set forth the objects and nature of my invention, and one construction embodying the principles thereof, what I claim as new and useful, and of my own invention, and desire to secure by Letters Patent, is:—

1. The method which consists in subjecting the eyeball to a fixed pressure and then measuring the extent of deformation produced on the eyeball by such pressure.

2. In an apparatus of the class described, a frame, an indicating mechanism carried thereby, a pivoted arm connected to said scale mechanism to operate the same, a gravity acting plunger movably mounted in said frame, and a lever carrying a roller interposed between said plunger and arm.

3. In an apparatus of the class described, a frame, a tubular member mounted in said frame, a plunger extending longitudinally through said tubular member, guides on said frame to hold said plunger out of contact with said tubular member, and an indicating mechanism operated by said plunger.

4. In an apparatus of the class described, a frame, a tubular member mounted therein, a plunger extending longitudinally through said tubular member and mounted for longitudinal gravity actuated movement therethrough, a holder for said tubular member, said holder and tubular member being mounted for relative movement longitudinally of the tubular member, and an indicating mechanism controlled by the longitudinal movements of the plunger.

5. In an apparatus of the class described, the combination with a frame, an indicating mechanism carried thereby, a pivoted arm connected to said scale mechanism to operate the same, a gravity acting plunger movably mounted in said frame and adapted to engage said pivoted arm, and a holder slidably mounted on said frame to support the same.

6. The method which consists in subjecting the eyeball to a fixed pressure and then measuring the extent of deformation produced on the eyeball by such pressure directly in readings of pressure required to cause the same extent of deformation on the normal eyeball.

7. In an apparatus of the class described, the combination with a frame, an indicating mechanism carried thereby including a pivoted arm and a pointer secured to said arm and means for mutually adjusting said arm and pointer, and a gravity actuated plunger movably mounted in said frame and adapted to engage said arm.

8. In an apparatus of the class described, a frame, means for holding and guiding said frame whereby the eyeball is subjected to the weight of said frame and means controlled by the resistance offered by the eyeball to such weight for measuring the extent of deformation produced on the eyeball by such weight.

9. In an apparatus of the class described, a frame, a tubular member mounted on said frame, a plunger extending longitudinally through said tubular member and mounted for longitudinal gravity actuated movement therethrough, a scale indicating mechanism controlled by the longitudinal movements of said plunger, and means for holding and guiding said frame whereby the eyeball is subjected to the weight of said frame, tubular member and plunger for actuating the same.

10. In an apparatus of the class described, a frame, a tubular member mounted on said frame, a plunger extending longitudinally through said tubular member and mounted for longitudinal gravity actuated movement therethrough, a scale indicating mechanism controlled by the longitudinal movements of said plunger and a slidable holder mounted on said frame for holding and guiding the same whereby the eyeball is subjected to the weight of said frame, tubular member, and plunger for actuating the plunger.

In testimony whereof I have hereunto set my hand in the presence of the subscribing witnesses, on this 27 day of November, A. D. 1914.

WILLIAM McLEAN.

Witnesses:
WALTER A. DARBY,
SAMUEL E. DARBY, Jr.